United States Patent [19]
Scharf

[11] Patent Number: 6,146,683
[45] Date of Patent: Nov. 14, 2000

[54] SAVORY VEGETABLE PREPARATION AND PROCESS FOR ITS PRODUCTION

[75] Inventor: Karl Scharf, Untergruppenback, Germany

[73] Assignee: Bestfoods, Englewood Cliffs, N.J.

[21] Appl. No.: 09/363,343

[22] Filed: Jul. 29, 1999

[30] Foreign Application Priority Data

Jul. 31, 1998 [DE] Germany ............ 198 34 638

[51] Int. Cl.⁷ ............... A23B 7/005; A23B 7/08
[52] U.S. Cl. ............ 426/638; 426/615; 426/639; 426/640; 426/646; 426/658
[58] Field of Search .............. 426/615, 628, 426/639, 640, 638, 658, 646

[56] References Cited

U.S. PATENT DOCUMENTS

| | | | |
|---|---|---|---|
| 4,042,720 | 8/1977 | Forkner | 426/639 |
| 4,241,093 | 12/1980 | Farag | 426/640 |
| 4,361,589 | 11/1982 | Wauters | 426/639 |
| 4,447,460 | 5/1984 | Lewis | 426/640 |
| 4,542,033 | 9/1985 | Agarwala | 426/640 |
| 4,547,389 | 10/1985 | Palnetkar | 426/639 |
| 4,681,770 | 7/1987 | Palmer | 426/615 |
| 4,683,141 | 7/1987 | Lewis | 426/640 |
| 4,889,730 | 12/1989 | Roberts | 426/639 |
| 5,094,860 | 3/1992 | Newhall | 426/640 |
| 5,227,183 | 7/1993 | Aung | 426/102 |
| 5,258,198 | 11/1993 | Bastean | 426/639 |
| 5,723,167 | 3/1998 | Lewis | 426/640 |

FOREIGN PATENT DOCUMENTS

| | | |
|---|---|---|
| 0 218 277 A3 | 4/1987 | European Pat. Off. . |
| 0 570 327 A1 | 11/1993 | European Pat. Off. . |
| 0 601 964 A2 | 6/1994 | European Pat. Off. . |
| 0572424 | 11/1996 | European Pat. Off. . |
| 0978237 | 9/2000 | European Pat. Off. . |
| 36 17 478 | 11/1987 | Germany . |
| 297 21 636 | 6/1998 | Germany . |
| 3-280858 | 12/1991 | Japan . |
| WO 92/14761 | 9/1992 | WIPO . |

OTHER PUBLICATIONS

European Search Report dated Dec. 3, 1999.

*Primary Examiner*—Carolyn Paden
*Attorney, Agent, or Firm*—Norris, McLaughlin & Marcus

[57] ABSTRACT

The invention relates to a process for producing a savory vegetable preparation which is storable at room temperature and is suitable as a topping and/or filling. According to the process, coarsely chopped vegetables are boiled in an aqueous polydextrose solution to form a substantially homogeneous base mass having a Brix of 65–72°, preferably 68–70° Bx. The base mass thus produced is admixed with structure-giving constituents in small pieces and, if appropriate, again briefly heated to form a preparation of 70–74° Bx which still comprises the structure-giving constituents in piece form. Then, with addition of seasoning and flavoring components and edible acids and/or their salts, a final Brix of 73–80° Bx, an $a_w$ of <0.85 and a pH of $\leq 5.5$ is achieved.

15 Claims, No Drawings

SAVORY VEGETABLE PREPARATION AND PROCESS FOR ITS PRODUCTION

BACKGROUND OF THE INVENTION

1. Field of the Invention

The invention relates to a savoury vegetable preparation which is storable at room temperature and is suitable as a topping and/or filling, and to a process for its production.

2. Description of the Related Art

Preparations of this type are widely known as relish and are used as hors d'oeuvre, for appetizers, as a topping or, depending on consistency, as a spread and, in particular, as a filling for snack products. If they are subjected to a baking process in the production of the end products, they must be substantially heat stable and resistant to baking.

Current vegetable preparations consist of a substantially homogeneous base mass in which structure-giving constituents in small or coarse pieces are present. The viscosity of the base mass varies depending on the application and is of importance for the product; furthermore, however, the consistency of the constituents in pieces determining the structure is of extraordinary importance for the organoleptic properties of the product. If these structure-giving constituents consist of vegetables, they must be subjected to at least one short-term cooking process or at least one blanching process in order to lose the properties of raw vegetables, on the other hand this heating process must not last too long, in order that these constituents in pieces do not likewise receive the pasty consistency of the base mass.

In order to achieve an at least restricted shelf life at room temperature, in the case of known preparations, usually chemical preservatives are used. By adding sugars, salt or acids, the keeping quality can be improved, likewise in a known manner, but these additions lead to a sensory effect which is not desired in the case of savoury vegetable preparations, which must not be too sweet, too salty or too sour. Preservation by intensified removal of water is problematic, because relatively long evaporation times can impair product quality and, because the product viscosity is increased too greatly as a result. Decreasing the $a_w$ value by adding, for example, maltodextrin, which would not lead to an unwanted taste effect, also leads to an unacceptable viscosity increase ($a_w$ value means water activity which is defined by the ratio of the vapor pressure of the water containing medium to the vapor pressure of pure water). Adding fat could compensate for an excessive viscosity, but products of this type generally contain little fat, or no fat at all.

Producing a savoury, neither too sweet nor too salty nor too sour, vegetable preparation of the current type is therefore a particular problem.

All percentages and parts set forth herein are by weight/weight unless designated otherwise.

SUMMARY OF THE INVENTION

The invention provides a process for producing a savoury vegetable preparation which is storable at room temperature and is suitable as topping and/or filling, which is characterized in that coarsely chopped vegetables are boiled in an aqueous polydextrose solution to form a substantially homogeneous base mass having a Brix (abbreviated as "Bx") of 65–72°, preferably 68–70° Bx, the base mass thus produced is admixed with structure-giving constituents in small pieces and, if appropriate, again briefly heated to form a preparation of 70–74° Bx which still comprises the structure-giving constituents in piece form, and then, with addition of seasoning and flavouring components and edible acids and/or their salts, a final Brix of 73–80° Bx, an $a_w$ of <0.85 and a pH of $\leq 5.5$, preferably <4.7 are set. A final Brix of 73°–75° Bx and an $a_w$ of 0.80–0.85 are sufficient if the preparation is used as filling or topping and a baking process follows in which there is further water removal and the Brix increases. However, preferably, a final Brix of 75–80° Bx and an $a_w$ of <0.80 in the final product are sought.

The vegetable preparations produced according to the invention have a long shelf life at room temperature and generally do not need addition of chemical preservatives.

DETAILED DESCRIPTION OF THE INVENTION

Polydextroses are known polymers of D-glucose, which are widely used as low-calorie, fiber-like sugar and fat substitutes in bakery products, fillings, coatings, jellies and salad dressings (cf. Food Technology, May 1991, 102/103). They are able to absorb moisture and have a similar water activity to sucrose. Their use in ready to eat water-in-oil emulsions is disclosed in EP-B1-218 277. A reduced polydextrose for use in foods is disclosed in EP-B1 572 424.

A series of polydextrose products is marketed under the trade name "Litesse" and is recommended for the most varied applications, including for bakery products, fillings and spreads, and for the most varied purposes, including as a fat substitute, binder, antifreeze, to reduce freezing point and softening of texture, for dough stabilization and as a moisture-retention agent to avoid migration of moisture and thus to prolong shelf life.

A product particularly suitable for the purposes of the present invention is a condensation polymer of D-glucose with sorbitol end groups and a reducing sugar content of no greater than 0.25% by weight, which is marketed under the trade name Litesse III.

The polydextrose is present in the vegetable preparation according to the invention in an amount between 20 and 80% by weight, generally between 30 and 75% by weight, and preferably in an amount of 40–70% by weight, in particular 55–65% by weight.

A part of the polydextrose, at most up to 20% by weight, generally up to 10%, can advantageously be replaced by other polymers or polyols, for example starch, maltodextrin, glucose syrup, oligofructose, inulin, Isomalt or sorbitol.

To produce the homogeneous base mass, coarsely chopped vegetables are used. Fresh vegetables or frozen vegetables can be used, or else pickled vegetables such as sauerkraut, but vegetable concentrates or preprepared vegetable purées can also be used. Vegetables which may be mentioned by way of example are: peppers, tomatoes, carrots, potatoes, cabbages, olives, onions, garlic, kohlrabi, spinach, sweetcorn, broccoli, leek, courgettes, pumpkin, mushrooms and ceps. Capsicum peppers, that is to say red, yellow and green peppers, and kohlrabi are preferred. Preferably, 100 parts by weight of fresh vegetables are used per 70–200 parts by weight of water and 100 parts by weight of polydextrose are used per 30–70 parts by weight of water.

The ratio of vegetables to polydextrose can vary within a broad range of 1:10 to 10:1.

Expediently, an aqueous polydextrose solution is prepared into which the coarsely chopped vegetables are introduced, frozen vegetables expediently being added to the still cold polydextrose solution and heated together with this. This mixture is boiled to form a substantially homogeneous, more or less viscous base mass having a Brix of 65–72°, preferably 68–70° Bx.

To this base mass the structure-giving constituents in small or coarse pieces are added. These can be granulated cheese and/or finely sliced meat products, such as ham, and/or dried fish products, but preferably vegetables are used as structure-giving constituent. These vegetables used as structure-giving constituent must be used as dried vegetables so that they retain their piece-like consistency and do not become pasty like the base mass and affect the Brix value in the desired manner. The protein products such as cheese or ham are also preferably added in substantially dehydrated form.

The vegetables added as structure-giving constituents in the dry state are preferably freeze-dried. They can be pretreated by blanching or subjected to drying in the fresh state. It is also possible to use puffed air-dried vegetables. The dried vegetables to be used as structure-giving constituents are preferably peppers, onions, garlic, tomatoes, leek, carrots, pumpkin, bamboo shoots, soy shoots, kohlrabi, mushrooms, celeriac, celery, broccoli, spinach, potatoe products, cabbages, asparagus, eggplants, courgettes, olives and sweetcorn. The addition to the base mass is preferably made while it is still hot from its production, if appropriate, after the addition, the entire preparation can again be briefly further boiled or again heated to form a preparation of 70–74° Bx which comprises the structure-giving constituents still in piece form of the desired consistency.

The amount of structure-giving constituents is generally 5–20, preferably 6–12, % by weight, based on the total mixture.

To this preparation are then or together with the structure-giving constituents added the pulverulent or liquid seasoning and flavouring components and edible acids. Components of this type are spices and herbs (fresh or dried), such as pepper, tomato powder, oregano, basil, thyme, curry powder, ginger powder, coriander, saffron powder; flavourings such as soya sauce, salt and edible acids and/or their salts such as citric acid and citrate.

By adding these seasoning and flavouring components and, if appropriate, by a further brief boiling, a final Brix of 73–80° Bx, an $a_w$ of below 0.85, preferably 0.72–0.78, and a pH of $\leq 5.5$, preferably below 4.7, most preferably 4.0 to 4.6, are established.

The vegetable preparations produced in this manner are easy to divide into portions and storable at room conditions, even without addition of preservatives. They can be consumed immediately, but can also be subjected to a baking process as coverings or fillings in snack products. To improve the stability to baking, it has proved to be expedient to add to the base mass some pectin and a sufficient amount of edible acid and/or their salts, such as calcium citrate. The amount of pectin is generally 0.3–0.7% by weight based on the end product.

EXAMPLE 1

200 g of finely chopped red and green peppers, frozen after preliminary cleaning, are heated in a solution of 500 g of polydextrose (Litesse III) in 300 g of water and boiled until a substantially homogeneous base mass having a Brix of 68° Bx is obtained. 20 g of dried tomatoes, 20 g of dried onions and 5 g of dried garlic are then added to this still hot base mass, all dried vegetables in large pieces. At the same time, 15 g of smoked ham in small pieces are added. After this addition, the mixture is kept at the boil for about one minute further, until a Brix of 72° Bx is obtained. Salt, seasonings and a mixture of dried herbs in powder form are thereupon added to the mixture, as well as citric acid to establish a pH of 4.3. After brief holding at a temperature somewhat below the boiling point, a final Brix of 77° Bx is established, whereupon the product is cooled as rapidly as possible. The $a_w$ of the end product was 0.76.

EXAMPLE 2

As in Example 1, 200 g of finely chopped fresh frozen yellow peppers are heated in a solution of 500 g of polydextrose (Litesse III) in 160 g of water which further comprises 4.5 g of pectin, and boiled to form a homogeneous base mass having a Brix of 70° Bx. 80 g of a dried mixture of finely chopped onions, garlic, red pepper and courgettes are then added to the base mass and the mixture is briefly heated until a Brix of 73° Bx is established. 10 g of salt, 2 g of seasoning mixture and 20 g of an aqueous solution of 1 g of citric acid powder and 1 g of tricalcium citrate are then added to the still hot mixture. This decreases the pH to 4.1. The end product had a Brix of 78° Bx and an $a_w$ of 0.75.

EXAMPLE 3

100 g of finely chopped red peppers, frozen after preliminary cleaning, are heated in a solution of 500 g of polydextrose (Litesse III) in 250 g of water together with 3 g pectin and boiled until a substantially homogeneous base mass having a Brix of 69° Bx is obtained. A mixture of 40 g of onions, 6 g of garlic, 20 g of olives, 50 g of tomatoes (all vegetables dried and in coarse pieces), 20 g of cheese granulate, 12 g of salt, 12 g of seasoning mixture, 1 g of citric acid and 0.3 g of calcium citrate in 17 g of water is then added to this still hot base mass. After this addition the mass is kept at the boil for about one minute further, until a Brix of 74° is obtained. After brief holding at a temperature somewhat below the boiling point, a final Brix of 76° Bx is established, whereupon the product is cooled as rapidly as possible. The $a_w$-value of the end product was 0.77, the pH-value was 4.2. The product is suitable as a pizza topping.

EXAMPLE 4

150 g of finely chopped red peppers, frozen after preliminary cleaning, are heated in a solution of 500 g of polydextrose (Litesse III) in 200 g of water together with 4 g pectin and boiled until a substantially homogeneous base mass having a Brix of 70° Bx is obtained. A mixture of 30 g of onions, 4 g of garlic, 10 g of celery, 10 g of zucchini, 30 g of tomatoes (all vegetables dried and in coarse pieces), 7 g of salt, 33 g of seasoning mixture, 1 g of citric acid and 1 g of calcium citrate in 20 g of water is then added to this still hot base mass. After this addition the mass is kept at the boil for about one minute further, until a Brix of 73° is obtained. After brief holding at a temperature somewhat below the boiling point, a final Brix of 77° Bx is established, whereupon the product is cooled as rapidly as possible. The $a_w$-value of the end product was 0.74, the pH-value was 4.1. The product is suitable as a barbecue relish.

EXAMPLE 5

500 g of finely chopped kohlrabi, frozen after preliminary cleaning, are heated in a solution of 500 g of polydextrose (Litesse III) in 100 g of water together with 4 g pectin, 6 g of hot peppers and 20 g potatoe granulate and are carefully brought to the boil in order to obtain a substantially homogeneous base mass having a Brix of 70° Bx. A mixture of 20 g of onions, 3 g of garlic, (both vegetables dried and in coarse pieces), 28 g of finely cut, air-dried bacon, 8 g of salt, 2 g of seasoning mixture, 1 g of citric acid and 0.5 g of calcium citrate in 20 g of water is then added to this still hot base mass. After this addition, the mass is kept at the boil for about one minute further, until a Brix of 73° is obtained. After a brief holding at a temperature somewhat below the boiling point, a final Brix of 76° Bx is established, whereupon the product is cooled as rapidly as possible. The $a_w$-value of the end product was 0.77, the pH-value was 4.4. The product is suitable as a relish-filling.

EXAMPLE 6

150 g of finely chopped yellow peppers, frozen after preliminary cleaning, are heated in a solution of 500 g of polydextrose (Litesse III) in 250 g of water together with 6 g pectin and boiled until a substantially homogeneous base mass having a Brix of 67° Bx is obtained. A mixture of 20 g of finely cut, freeze-dried, cooked chicken, 30 g of onions, 4 g of garlic, 10 g of zucchini (all vegetables dried and in coarse pieces), 5 g of salt, 12 g of seasoning mixture, 1 g of citric acid and 1 g of calcium citrat in 25 g of water is then added to this still hot base mass. After this addition, the mass is kept at the boil for about one minute further, until a Brix of 73° is obtained. After a brief holding at a temperature somewhat below the boiling point, a final Brix of 75° Bx is established, whereupon the product is cooled as rapidly as possible. The $a_w$-value of the end product was 0.79, the pH-value was 4.4. The product is suitable as an appetizer.

I claim:

1. A process for producing a savoury vegetable preparation which is storable at room temperature and is suitable as a topping and/or filling, comprising boiling coarsely chopped vegetables in an aqueous polydextrose solution to form a substantially homogeneous base mass having a Brix of 65–72°, admixing the base mass thus produced with structure-giving constituents in small pieces and, then adding seasoning and flavouring components and edible acids and/or their salts to obtain a final Brix of 73–80° Bx, an $a_w$ of <0.85 and a pH of ≦5.5.

2. The process of claim 1 wherein the final Brix is 75–80° Bx and the $a_w$ is <0.80.

3. The process of claim 1 wherein 100 parts by weight of fresh vegetables are used per 70–200 parts by weight of water.

4. The process of claim 1 wherein 100 parts by weight of polydextrose are used per 30–70 parts by weight of water.

5. The process of claim 1 wherein the coarsely chopped vegetables are selected from the group consisting of green, red and/or yellow peppers or kohlrabi.

6. The process of claim 1 wherein the structure-giving constituent is comprised of dried vegetables and/or granulated cheese and/or finely sliced meat.

7. The process of claim 6 wherein the dried vegetables comprise peppers, onions, garlic, tomatoes, leek, carrots, pumpkin, bamboo shoots, soy shoots, courgettes, olives and/or sweetcorn.

8. The process of claim 1 wherein the structure-giving constituents are added in an amount of 5–20% by weight.

9. The process of claim 1 wherein the final Brix is established by boiling.

10. The process according to claim 1 wherein pectin and sufficient edible acids and/or their salts are added to improve the stability to baking of the base mass.

11. The process according to claim 1 wherein, as polydextrose, a condensation polymer of D-glucose with sorbitol end groups and a reducing sugar content of no greater than 0.25% by weight is added.

12. The process of claim 1 further comprising the step of briefly heating the base mass to form a preparation of 70–74° Brix.

13. A room-temperature storable, savoury vegetable preparation suitable as a topping and/or filling, consisting of a substantially homogeneous base mass of cooked vegetables and polydextrose which comprises structure-giving food constituents in small pieces, has a Brix of 73–80° Bx, an $a_w$ <0.85 and a pH ≦5.5.

14. The vegetable preparation of claim 13 comprising 20–80% by weight of polydextrose.

15. The vegetable preparation of claim 13 having a Brix of 75–80° Bx and an $a_w$ <0.80.

* * * * *